C. A. DIES.
MILLING CUTTER.
APPLICATION FILED DEC. 31, 1912.

1,140,130.

Patented May 18, 1915.
2 SHEETS—SHEET 1.

Witnesses:
Harry S. Gaither
Anna L. Walton

Inventor:
Charles A. Dies
by Sheridan, Wilkinson, Scott & Richmond
his Attorneys

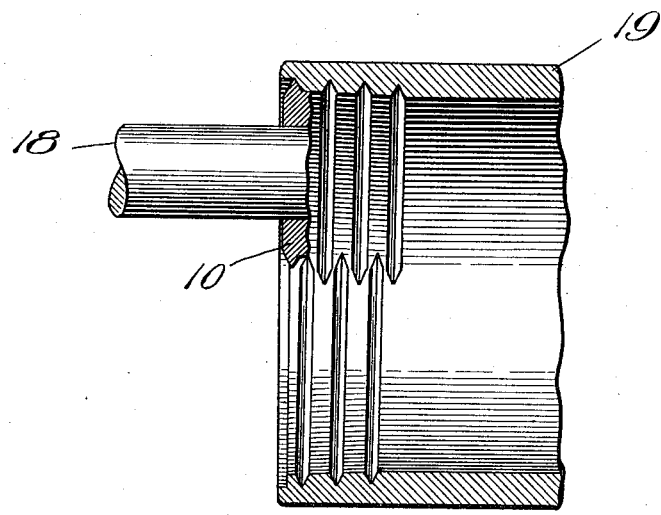
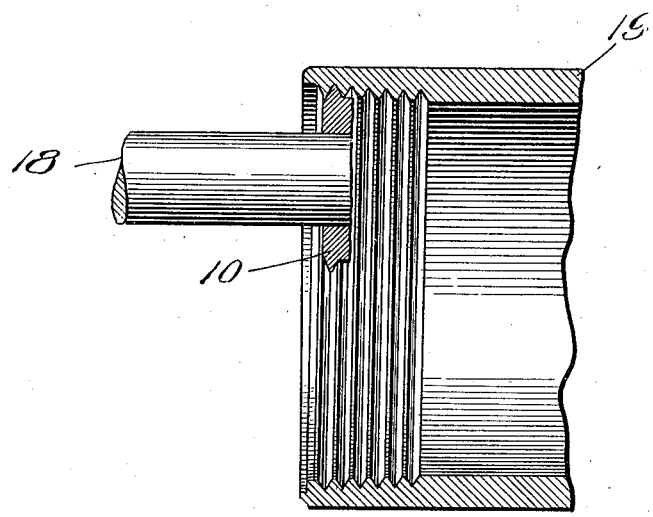

UNITED STATES PATENT OFFICE.

CHARLES A. DIES, OF EVANSTON, ILLINOIS, ASSIGNOR TO CLAYTON MARK, OF EVANSTON, ILLINOIS.

MILLING-CUTTER.

1,140,130. Specification of Letters Patent. Patented May 18, 1915.

Application filed December 31, 1912. Serial No. 739,436.

*To all whom it may concern:*

Be it known that I, CHARLES A. DIES, a citizen of the United States, residing at Evanston, in the county of Cook and State of Illinois, have invented certain new and useful Improvements in Milling-Cutters, of which the following is a specification.

This invention relates to improvements in milling cutters, and has for its object to provide an improved milling cutter for use in milling threads.

Hitherto the milling of threads has been attended with considerable difficulty and has had many drawbacks, and it has been found in the use of the ordinary milling cutter that the threads when completed are not smooth, but are rough and unfinished. To do away with the above-mentioned difficulties and cut a smooth finished thread without cramping of the cutter, and without unnecessary binding and friction, is the principal object of this invention.

Figure 1:
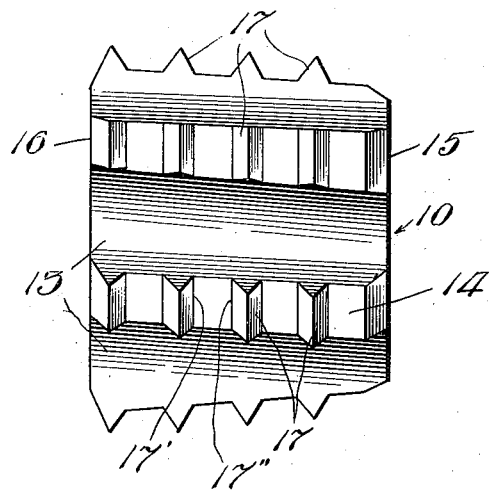
Figure 2:
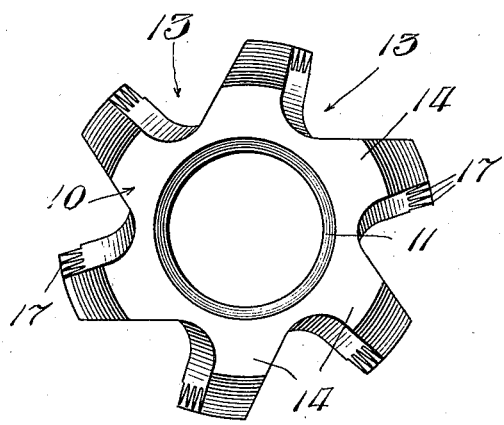
Figure 3:
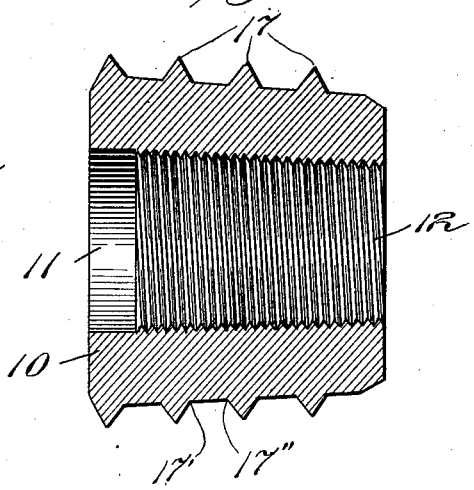

In the accompanying drawings—Figure 1 is a side elevation of the cutter; Fig. 2 is an end elevation of the same; Fig. 3 is a longitudinal section through the cutter; Fig. 4 is a longitudinal cross section showing the cutter broken away after the completion of the initial cut; and Fig. 5 is a view similar to Fig. 4 after the completion of the final cut.

Like figures refer to like elements throughout the drawings.

This device is designed for use in milling internal or external threads in couplings, pipes, or other work. Hitherto in the milling of threads, the milling cutter has been rotated on its axis at a comparatively high rate of speed while the work is rotated at a comparatively slow rate of speed about its axis, the cutter being located eccentrically with respect to the work and either the cutter or the work moved longitudinally at a rate of speed proportioned to its rotation so as to advance the same a distance equal to the pitch of the thread for one rotation of the work. This device is intended for use in such milling and embodies essential differences which will be brought out in the following description.

The cutter is denoted generally by the numeral 10, and is formed with a central tapered aperture 11 threaded internally at 12 to engage a spindle 18 or other carrying member, shown in Figs. 4 and 5. The body of the cutter is fluted longitudinally, as shown at 13, leaving the projections 14 on the outer periphery thereof. The cutter is so fluted that the projections have their front side or face inclined slightly with respect to planes through the longitudinal axis of the cutter proper, as will be apparent in Figs. 1 and 2 of the drawings. These projecting shoulders 14 are thereby formed thicker at their front ends 15 than the portions 16 at their rear ends, as shown in Fig. 1 of the drawings, for a purpose to be hereinafter described.

Teeth 17 are formed on the projecting members 14, of the size desired and spaced a predetermined distance apart. The teeth on each shoulder are so cut, or otherwise formed, as to form with the corresponding teeth on the shoulders concentrically arranged series in planes approximately at right angles to the axis of the cutter proper. These teeth on each shoulder are spaced apart a distance between their points equal to twice the pitch of the thread to be cut by the cutter—that is, from the point 17 at the apex of one tooth to the point 17 at the apex of the adjacent tooth is a distance equal to the pitch of the thread to be cut, as shown in Fig. 3 of the drawings.

It will be apparent that having the extremity 15 of each shoulder slightly thicker than the extremity 16, in the manner shown in Figs. 1 and 2 of the drawings, the concentric series of teeth nearest the extremity 15 will engage the work first, and the engagement of successive teeth along each shoulder will be gradual rather than coincident.

The operation or use of the cutter is as follows: The cutter is carried by a spindle or other member 18, as shown in Fig. 4 of the drawings, and rotated about its axis at the desired cutting speed. 19 designates a coupling or pipe in which it is desired to mill an internal thread. This pipe 19 will be rotated about its axis at a selected speed while the spindle 18, carrying the cutter 10, is rotated at the cutting speed about its axis, which will preferably be inclined so as to bring the concentric circles of teeth at the desired angle, that is, planes through the concentric circles of teeth will be approximately parallel with planes through the segments of the threads adjacent the cutting point. The spindle 18 is advanced longitudinally relative to the work 19 at a speed so proportioned to the rotation of the work as to advance the milling cutter a distance equal to the pitch of the thread being cut for one revolution of the work; so that at the completion of one rotation of the initial cut, as I have termed it, the pipe 19 will present an appearance similar to that shown in Fig. 4 of the drawings, the cutter being broken away to clarify the showing.

It will be apparent that the thread is incomplete at the completion of the initial cut, since the cutting teeth of the milling cutter 10 being spaced between their points a distance equal to the pitch of the thread, the advancement of the milling cutter 10 a distance equal to the pitch of the thread will cause a series of incomplete threads, as shown in Fig. 4. Upon the next revolution of the work, however, the final cut, as I have termed it, is taken, and the thread is completed, as shown in Fig. 5.

By this construction and method of cutting I have found that the use of the ordinary thread milling cutter is obviated and a smooth continuous thread is cut.

While I have described a particular method of using this cutter, I do not wish to be confined thereto, nor do I wish to be confined to the form or dimensions of the device shown in the drawings beyond the scope of the appended claims.

What I claim is:—

1. A milling cutter adapted for use in cutting threads, said cutter comprising a body fluted to form longitudinal shoulders on the outer periphery thereof, each of said shoulders being provided with a series of cutting teeth and having the forward side thereof inclined relatively to a plane containing the longitudinal axis of said cutter, each of said shoulders having its rear side lying in a plane containing said longitudinal axis.

2. A milling cutter comprising a plurality of concentric series of teeth, the teeth of adjacent series lying in rows longitudinally of said cutter, each of said concentric series of teeth being spaced from the adjacent series a distance between their points approximately equal to twice the pitch of the thread to be cut by said cutter.

3. A milling cutter adapted for use in cutting threads, said cutter being tapered toward its front portion, shoulders formed on said cutter, teeth carried by each of said shoulders, said teeth being arranged in concentric series, each series being spaced from the adjacent series a distance between their points equal to twice the pitch of the thread to be cut.

In testimony whereof, I have subscribed my name.

CHARLES A. DIES.

Witnesses:
E. A. BRUYL,
CARL O. BERGMAN.

Copies of this patent may be obtained for five cents each, by addressing the "Commissioner of Patents, Washington, D. C."